United States Patent
Johnson (10) Patent No.: US 8,328,244 B2
(45) Date of Patent: Dec. 11, 2012

(54) SPLIT GXR COLLAR FRONT MOUNTED CLAMP ASSEMBLY

(76) Inventor: Theodore D. Johnson, Clearwater, FL (US); Robin Boley-Johnson, legal representative, Clearwater, FL (US)

( * ) Notice: Subject to any disclaimer, the term of this patent is extended or adjusted under 35 U.S.C. 154(b) by 102 days.

(21) Appl. No.: 12/958,246

(22) Filed: Dec. 1, 2010

(65) Prior Publication Data

US 2012/0013119 A1   Jan. 19, 2012

Related U.S. Application Data

(60) Provisional application No. 61/363,917, filed on Jul. 13, 2010.

(51) Int. Cl.
*F16L 23/00* (2006.01)
(52) U.S. Cl. ......... 285/414; 285/305
(58) Field of Classification Search ........... 285/305, 285/330, 331, 336, 414, 415, 913, 921, 136.1
See application file for complete search history.

(56) References Cited

U.S. PATENT DOCUMENTS

| | | | | |
|---|---|---|---|---|
| 944,503 A | * | 12/1909 | Rev ............................... | 285/73 |
| 3,764,226 A | * | 10/1973 | Matto ........................ | 415/214.1 |
| 5,295,506 A | * | 3/1994 | Smith ............................ | 137/271 |
| 6,539,920 B1 | * | 4/2003 | Spiers ............................ | 123/456 |
| 6,908,123 B2 | * | 6/2005 | Le ................................. | 285/402 |
| 7,690,694 B2 | * | 4/2010 | Poder ............................. | 285/314 |
| 7,798,537 B2 | * | 9/2010 | Nakamura et al. ............. | 285/401 |
| 2003/0155765 A1 | * | 8/2003 | Thomas et al. ................ | 285/305 |

FOREIGN PATENT DOCUMENTS

| EP | 310369 A1 | * | 4/1989 |
|---|---|---|---|
| JP | 05231581 A | * | 9/1993 |

* cited by examiner

*Primary Examiner* — Aaron Dunwoody
(74) *Attorney, Agent, or Firm* — Ronald E. Smith; Smith & Hopen, P.A.

(57) ABSTRACT

A sanitary coupling and seal forming system which can be front mounted. Front mounted refers to a seal fitting that can be installed directly behind a coupling. It is intended to be easily manufactured, installed, disposable, and reusable. A two part seal fitting which is formed from two arc-shaped sealing elements each having one of two different inventively designed termini. Each termini are complementary with termini of different types allowing a system which can be opened or act as a hinge. The seal fitting can be axially brought into engagement with a sanitary coupling which bears complementary components. Thus the seal assembly allows for quick connection and disconnection by the sealing assembly.

7 Claims, 9 Drawing Sheets

SPLIT GXR COLLAR FRONT MOUNTED CLAMP ASSEMBLY

RELATED APPLICATION

This application claims the benefit of U.S. Provisional Application No. 61/363,917, filed Jul. 19, 2010, the disclosure of which is hereby incorporated by reference.

BACKGROUND OF THE INVENTION

In-line connector seals for use in circulating systems usually require two cooperating halves. Most designs are such that each half has a cylindrical axis parallel to flow, and engagement of the halves is accomplished by urging the halves together along the cylindrical axis. Generally, the halves have a "gendered" design, such that two differently-designed halves are required to complete a single seal. "Genderless" connector systems, which generally require only a single piece design, function by the interlocking of two substantially identical pieces in order to form the seal. The convenient, symmetric design of genderless connectors simplifies manufacture of sealing system components in that only one piece need be designed and fabricated. The piece shape is such that it is structurally self-complementary: two substantially identical pieces, each having essentially the same design, can be interlocked to complete a seal. The word "substantially" as used herein is intended to include within the ambit of the meaning of the term "genderless connector" connectors in which exist slight differences in design, between the pieces, which are not material to the act of forming the seal.

However, the features which make genderless designs simple to use, such as simplicity of design and manufacture, as well as minimal number of components, can limit them with respect to certain types of seal locations and environments. For example, "collar-type" genderless connector designs generally employ two collar elements, each of which seats a phlange-type "face element." The "face elements" are immobilized in face-to-face contact by urging the collar elements together along the axis of expected flow (the cylindrical axis) such that the collar elements come into contact and are immobilized, such as, for example, by a circumferential clamp. Such a system can easily be employed if a collar element can be inserted in line (such as, for example, by opening and reclosing a circulating system line) and brought into contact with the back of a face element component. Genderless connectors involving collar elements attached to circulatory tubing can be used where a free end is available such that the collar element can be installed either by threading it onto the circulator tubing to the rear of the face element, or detaching the face element from its connective tubing, inserting the collar element over the detached tubing end, and reattaching the face element.

However, in many applications, a seal is required at a position which is inaccessible to standard collar elements. For example, an integral or otherwise irremovable port, such as port vessel bearing a welded fitting, cannot be easily modified to accept an inline addition. The face component of the port may be attached to the vessel in a manner which prevents breaking the line and sliding a collar into contact with the back of the face component.

In such cases, if a collar element is to be used, it must be assembled about the tubing to form a closed element, preferably with only minimal loss of structural integrity relative to one-piece molded collar element components. However, the requirement for multiple pieces can eliminate the manufacturing and use advantages associated with genderless collar element designs. Furthermore, a collar formed from two or more separate pieces can be expected to lack the structural integrity of a one piece collar. Lack of structural integrity has contributed to the failures of other multipart systems of similar nature. For example, the process of completing or reopening the seal can often force the components of a two-part seal fitting apart due to the resultant forces upon the components as the two-piece seal fitting is linked up with a one-piece seal fitting.

Furthermore, the need for two different pieces in order to assemble one seal fitting complicates fabrication, purchasing, storage, and implementation of the sealing assembly.

As an example of the types of fittings encountered in the pharmaceutical, dairy, food and beverage industries, the use of the sanitary coupling system for fluid connections defined in ISO 2852 and the ASME-BPE Standards of 2009 is widespread. Such couplings can be stainless steel welded couplings as well as plastic disposable fittings. It is necessary that the plastic disposable fittings fit the stainless steel sanitary couplings that may be welded into place on piping or tanks. Two sanitary couplings involved in a connection are often held in contact by an external sanitary hinged screw clamp.

Because of the need for a front mountable seal fitting, there have been attempts to employ a multipart system which externally secures two sealing members. However, many such systems must be secured with additional accessories, such as clamps, or they include connecting mechanisms which require fragile, flexible tabs, which, in the case of one-piece molded components, generally break off easily or easily undergo irreversible deformation. Thus, with regard to two-piece seal fittings, replacement of the components is often required upon seal opening and reforming.

Designs containing "living hinges" comprise flexible elements which connect the components, such as a flexible bridge of polymeric material. Such connections can be prone to stretching or breaking. For example, the act of forcing a component closed about a sealing interface can leverage the flexible connecting element, stressing or inelastically deforming it. Both effects can reduce the ability of the element to draw sealing faces together to form a tight seal, particularly with repeat use. Furthermore, the inclusion of a flexible element can greatly complicate the one-piece manufacture of the element. For example, with respect to common molding procedures, such as one-piece molding, the mold would generally include the flexible element, which would most conveniently be of the same material as the components connected by it, thus limiting the range of materials which can be employed in the fabrication. Another disadvantage of living hinges is that seal fittings comprising them can only open on one side, placing limits on its working orientation and limiting the manner in which the seal can be opened and reclosed. A general characteristic of the living hinge-containing system is that articulation essentially takes place about an axis which is essentially the center of the hinge. While forces encountered in completing the sealing assembly generally do not cause a complete separation of the subelements, the connector can be weakened from simple repetitive articulation, and deformed or stretched by prolonged tight closure about a face element. Tension upon full closure of the seal fitting halves about the face element can stretch or deform the living hinge.

The foregoing notwithstanding, there is a need for a seal fitting which can be 1) front-mounted on circulating systems without breaking into circulatory line tubing or other conduits, and 2) opened and reclosed accessibly, without compromising the sealing integrity of the sealing assembly or the mechanical integrity of a one-piece system.

Furthermore, it is desirable that a seal fitting incorporate characteristics of a living hinge, such as the capacity to similarly articulate to an open configuration, optionally, with the articulation centered about a single locus, as with a hinge. However, it is desirable that the accessibility of the seal via the seal fitting be increased relative to that of a living hinge, such that the seal fitting can be opened from more than one locus for increased ease of application and removal of the seal fitting. Further desired is a seal fitting, which, like a living hinge, will not readily separate into subcomponents upon articulation, yet, unlike a living hinge, can be initially installed by combining two separate subcomponents. Preferred is a seal fitting which, when exercised into an open articulation resists separation into two subcomponents by the application of independent linear forces, for example, diametrically opposite forces, such as would be experienced by the seal fitting upon articulation and removal. Also desired is a seal fitting having the ability to hold sealing faces together firmly, yet allowing easy access to the sealing faces such that the seal can be opened and reformed, if necessary, with no loss in sealing efficiency. Furthermore, a seal fitting design which met the above criteria, but also comprising substantially identical subsections, would greatly simplify production in that only a single type of piece would need to be purchased and stored to fabricate the collar.

BRIEF DESCRIPTION OF THE INVENTION

Figure 1:
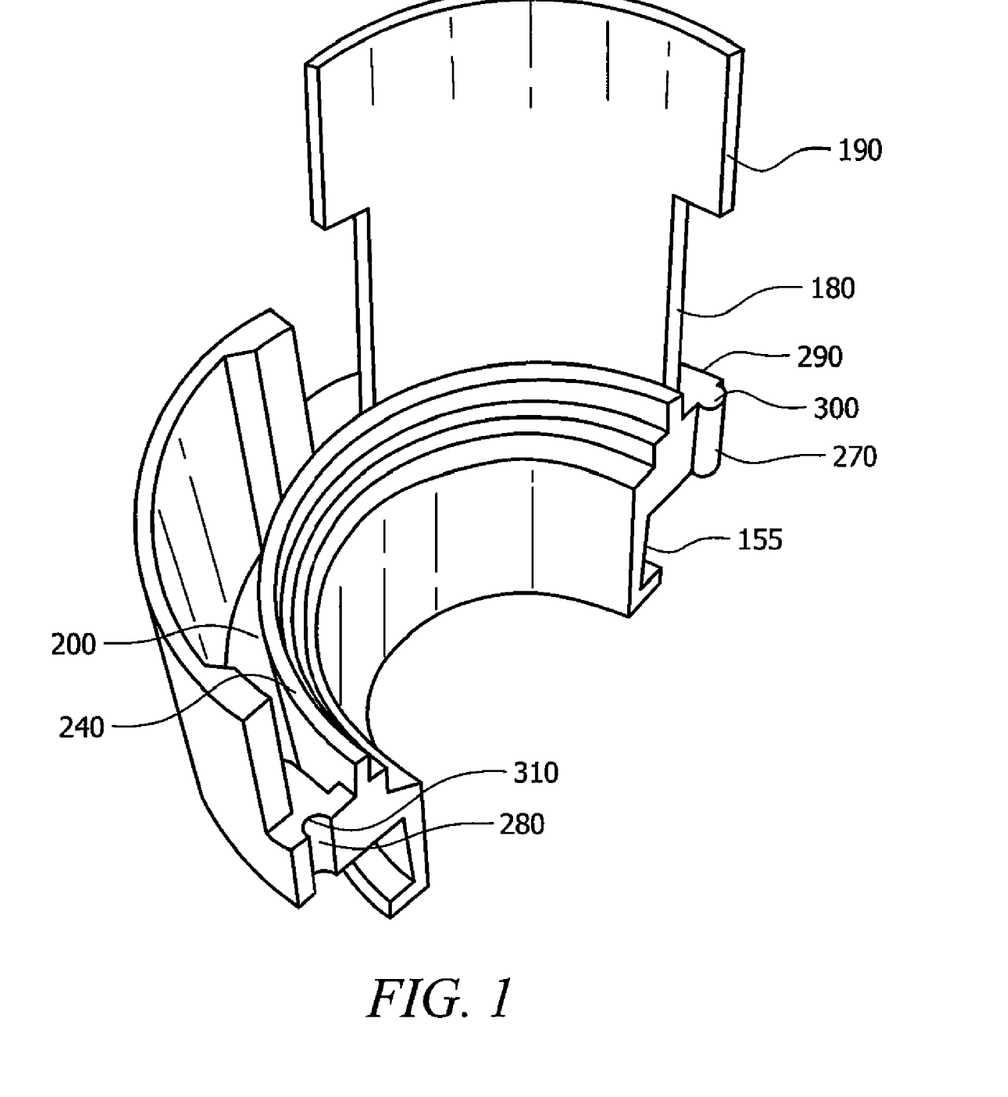
FIG. 1 depicts a seal fitting subcomponent according to one embodiment of the present invention.

The present invention provides connections between couplings in which one or both of the couplings cannot be accessed by one-piece seal fittings, particularly stainless steel welded couplings and plastic or steel individual fittings (see FIG. 1) attached to tubing or rigid conduit material such as metal piping. The invention described herein is an easily manufactured, easily installed, disposable, re-usable sanitary coupling and seal-forming system which can be front mounted. By "front-mounted" is meant that the seal fitting can be installed directly behind a coupling, which is an advantage in that the system is not limited by the accessibility issues, as elucidated herein, ordinarily associated with welded or molded couplings. The system comprises a two part seal fitting which is formed from two arc-shaped sealing elements, each having one each of two different inventively designed termini. The seal fitting formed therefrom can be axially brought into engagement with a sanitary coupling which bears complementary components, to form a sealing assembly allowing for quick connection and disconnection—making, or, respectively, breaking the seal created by the sealing assembly. One embodiment comprises a seal fitting comprising two subcomponents, each being identical with respect to having one of two different termini, at each end of an arc-shaped piece, such that each arc-shaped piece bears one of each type of terminus. Termini of different types are complimentary. In some embodiments, when the complimentary termini of different sealing elements are brought together, they form a functioning hinge which can easily accommodate the spreading of the unattached termini without mechanically stressing the hinging termini. There is thus no risk of distorting molded components and jeopardizing the quality of a re-formed seal at the sealing faces enclosed by the sealing assembly. The articulation is to such a degree that the stem of the welded sanitary fitting can be moved through the spread termini into the opened seal fitting. Surprisingly, the non-contacting termini can be articulated widely enough to allow the passage of tubing or other conduits into and out of the seal fitting. In particular, in one embodiment, once a small degree of articulation has taken place, no opposing linear motions, applied independently to the subcomponents, regardless of the motion directions, can mechanically disengage the subcomponents without encountering mechanical resistance originating within the hinged termini. An increase in articulation only amplifies the foregoing: the broader the articulation, the more securely the hinge remains entire.

During the act of closing the opened seal fitting around the stem, the spread ends approach until the termini come into mutual contact. In one embodiment (FIG. 1), the mutually contacting termini lock with a snap fit engagement. In another embodiment (FIG. 7), the termini, once in contact, do not undergo relative motion in the direction of the axis of flow, and in other embodiments, termini, once in contact are partially immobilized by friction due to a close fit; upper and lower caps (220) fit a projecting terminus (210) closely enough such that separation of the subcomponents is somewhat impaired. In both embodiments, the coupled subcomponents comprise a "seal fitting," or one half of a sanitary coupling engagement system, or "sealing assembly." Despite the fact that the formerly spread termini have contacted, and in some embodiments, snap-locked, the seal fitting can be reopened at the same side which was opened formerly. Surprisingly, the seal fitting can alternatively be opened at the side which, in the first embodiment, originally acted as a hinge. The closed configuration can be opened, and, in the case of a snap-lock engagement, the act of opening involves defeating a snap engagement comprised of the same termini which previously comprised the inseparable components of the hinge. The termini which formerly formed a hinge can, surprisingly, be separated, while the termini formerly articulated can enmesh and function as a hinge. In the case of the snap lock embodiment, upon articulation of the formerly hinged termini, the hinged termini cannot be disjoined.

Figure 8:
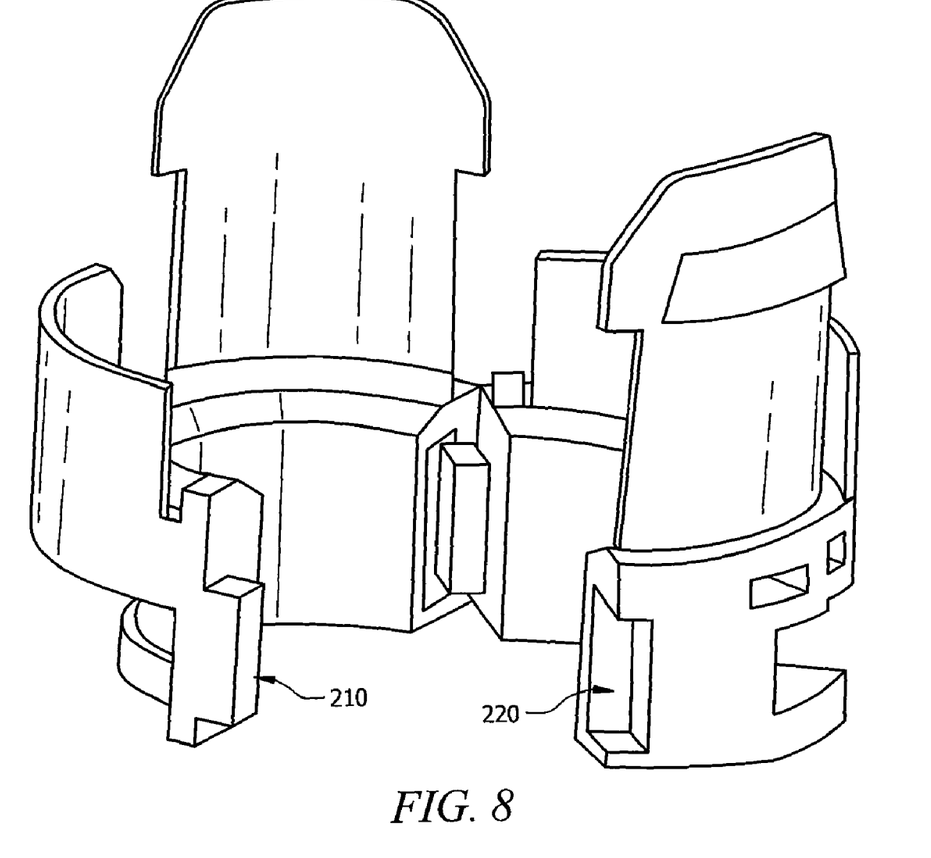
FIG. 8 depicts two subcomponents as in FIG. 7, articulated into an open position.
Figure 9:
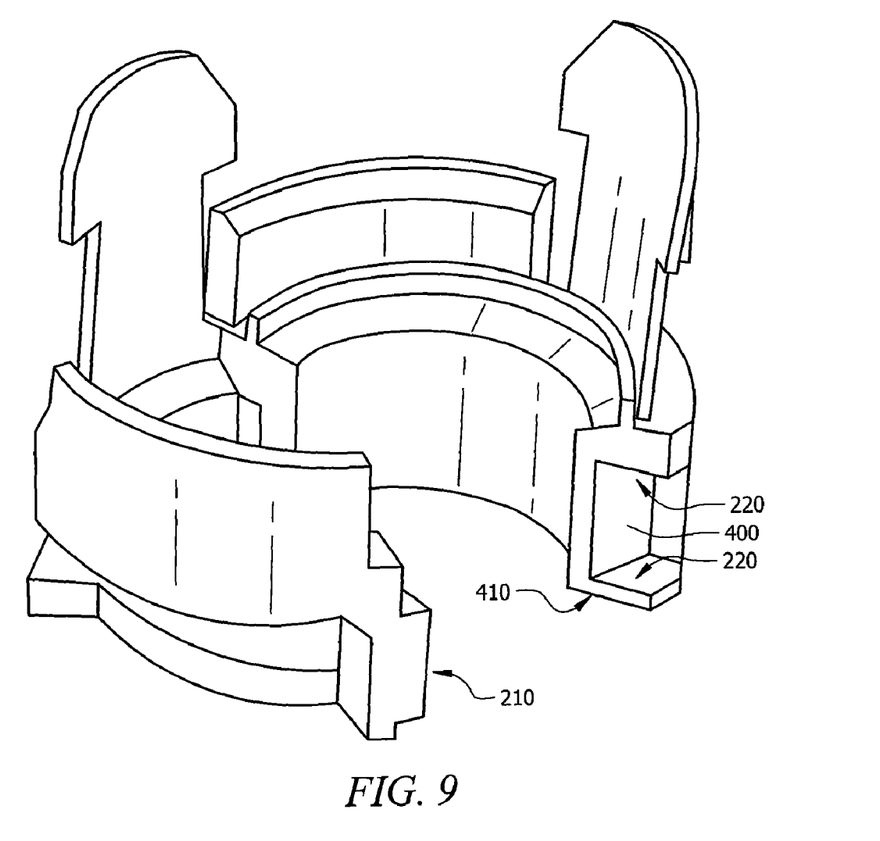
FIG. 9 depicts two subcomponents as in FIG. 7, and a plastic securing band seated in a port.

A elucidated above, the first embodiment, which can have the ability to form a snap fit, minimizes the effect of radial forces generated during seal formation. However, other forces, such as forces parallel to the intended axis of flow, are generated, albeit temporarily, when the sealing members are forced into contact during the act of seal formation. As with radial forces, vertical forces can disrupt the contact and connection between seal fitting subcomponents, increasing the chance of separation, or being forced together in slightly mismatched orientations, which could damage or break the sections, resulting in the formation of a seal having reduced integrity. In another embodiment of the present invention, a seal fitting subcomponent is provided which prevents subcomponents from vertical displacement (i.e., displacement parallel to the axis of flow) with respect to each other during seal formation. The attachment is such that the two subcomponents (200, 210) can be separated by opposing linear motions, even upon articulation (see FIGS. 8 and 9). In such embodiments, a securing means, such as, for example, a band or clamp (220), may be used to hold the subcomponents together. In one embodiment, the securing means is a band having a thickened end (230) and a tailing end (240) which interacts with the thickened end. The thickened end may be a sleeve which accepts the tailing end. The tailing end can be advanced through the securing end, in some embodiments, irreversibly, such that normal efforts to withdraw the tailing end are ineffective. In one embodiment, each sealing subcomponent comprises a port (250) which is capable of seating and immobilizing the securing end upon insertion of the band through the port, tailing end first. In another embodiment, the securing end is a thickened end which tracks the tailing end between the securing end and the port, such that both act to prevent the withdrawal of the tailing end.

The separable sub-elements have a symmetry by which they can reversibly engage to complete a seal fitting, which, when engaged with a complimentary seal fitting, can form a sanitary sealing assembly, or seal fitting assembly. In one embodiment, a sanitary coupling is converted into a sanitary sealing assembly comprising a two part seal fitting and a complementary seal fitting. In a further embodiment, the complementary sanitary fitting is a single component seal fitting, preferably one-piece molded, such that an integrated collar-type seal fitting is formed, rather than the two-element seal fitting. In a different further embodiment, the sealing assembly is formed wherein both the first and second seal fittings comprise two sealing elements, the elements of the first fitting being essentially the mirror image of the elements of the second fitting.

DETAILED DESCRIPTION OF THE INVENTION

Provided is a sealing assembly which 1) can be repeatedly opened and reclosed without suffering loss of sealing efficiency; 2) can independently articulate at opposite sides of the two piece seal fitting comprising the sealing assembly, in one embodiment, articulation taking place about an axis; 3) is devoid of breakable tabs; and 4) is structurally stable, such that the two sub-component sealing element has resistance to fragmentation into its subcomponents despite the stress of deformation encountered during seal formation and seal breaking.

In one embodiment, the invention comprises a sealing assembly (60). The sealing assembly comprises a first (70) and second (80) sealing member, each of which comprises a face component bearing an annular groove (100). At least the first sealing member includes a hose connector component (110) which is integral with its associated face element (120). Also included in the first sealing member is one or more gasket members (130) partially or fully comprising at least one elastomeric material. The one or more gasket members are receivable into the annular grooves of the respective sealing members. The first sealing member further includes a collar component which comprises two subsections (140) and (150), each of which contacts the face and/or hose connector component over an arc of substantially 180 degrees. Each subsection comprises a face element seat (155). The face element seat serves to embed the face element reverse (160) into the collar when the collar subsections are in place. The seat extends to a diameter which is less than the diameter of the collar subsection, measured from the cylindrical axis of the face element. In one embodiment, the face element seat bears a lip, ridges or other projections which can interlock with one or more ridges on the reverse of the face element, substantially immobilizing the face element with respect to the face element seats with respect to motion in directions perpendicular to the cylindrical axis. In another embodiment, the reverse of the face element bears a continuous ridge which interlocks with a lip borne by the face element seat.

At a diameter outside the greatest diameter of the seat, the collar comprises at least one arc-shaped pedestal (180) which extends away from the sealing assembly in a direction roughly perpendicular to the face of the face element. In one embodiment, the pedestal bears a barb (190) which overhangs the pedestal in a roughly circumferential manner in one or both lateral directions. As indicated infra, in one embodiment, the barb does not comprise laterally overhanging sections. The arc of the arc-shaped pedestals may be parallel to the curvature of the collar, but it can also be of lesser or greater curvatures along its length. The arc shape allows the pedestal to flex reversibly in a radial direction, with greatest flexibility toward (in the direction of) the cylindrical axis.

The barb can be located atop the pedestal. However, in some embodiments, the barb is at other locations on the pedestal. In one embodiment, the barb is on the outer side of the upper portion of the pedestal, and facing outward such that upon contacting the receiving area, the pedestal is flexed inwardly. This is a preferred configuration in that curvature of the arc provides support without greatly impeding the inward-flex of the tangs. In other embodiments, the pedestal bears two or more barbs laterally separated at equivalent heights on the pedestal. It is preferred that the barbs are positioned at a height on the pedestal such that upon completion of the mating approach with the corresponding sealing element, the barb snaps into a position which effectively prevents axial motion of the sealing elements with respect to each other. In a preferred embodiment, the distance between the lower edge of the barb and the upper surface of the collar is substantially equal to the distance between the upper edge of the guard wall and the lower edge of the outer wall of the receiving area. The barb snaps abruptly against the lower edge of the outer wall of the receiving area. The substantial match of the above distances ensures that the sealing elements, once completely mated, are essentially mutually immobile unless the barb is released by, for example, pinching the tangs such that the lower edge of the barb laterally clears the outer wall of the receiving area. In other embodiments, the mated sealing elements are mutually immobilized by other intolerances, such as, for example, the meeting of face element interfaces.

As alluded to in the prior paragraph, the collar additionally comprises one or more receiving areas (200) adjacent the pedestal at a diameter outside the diameter to which the face element extends. The receiving area comprises an arc-shaped slot having inner (220) and outer (230) walls at inner and outer wall diameters, and respectively, as well as an arc-shaped guard wall (240) positioned at a diameter outlying the diameter of the outer wall, wherein the diameter is measured from the cylindrical axis of the face element.

In another embodiment, the subsections further comprise a means for mutually contacting the collar elements such that they close about the connector stem and are secured with a snap fit and do not require a securing element such as a circumferential band or clamp. In one embodiment, the collar elements comprise two novel tab-and-slot hinge termini. The hinges each comprise interlocking convex and concave tabs. Both subsections bear one of each. In a preferred embodiment, shown in FIGS. 1 and 2, each subsection comprises end modifications such that the an indentation at one end of their length in the surface can nest and rotatably articulate such that upon articulation, the seal fitting subelements must be unarticulated in order to be separated.

Figure 3:
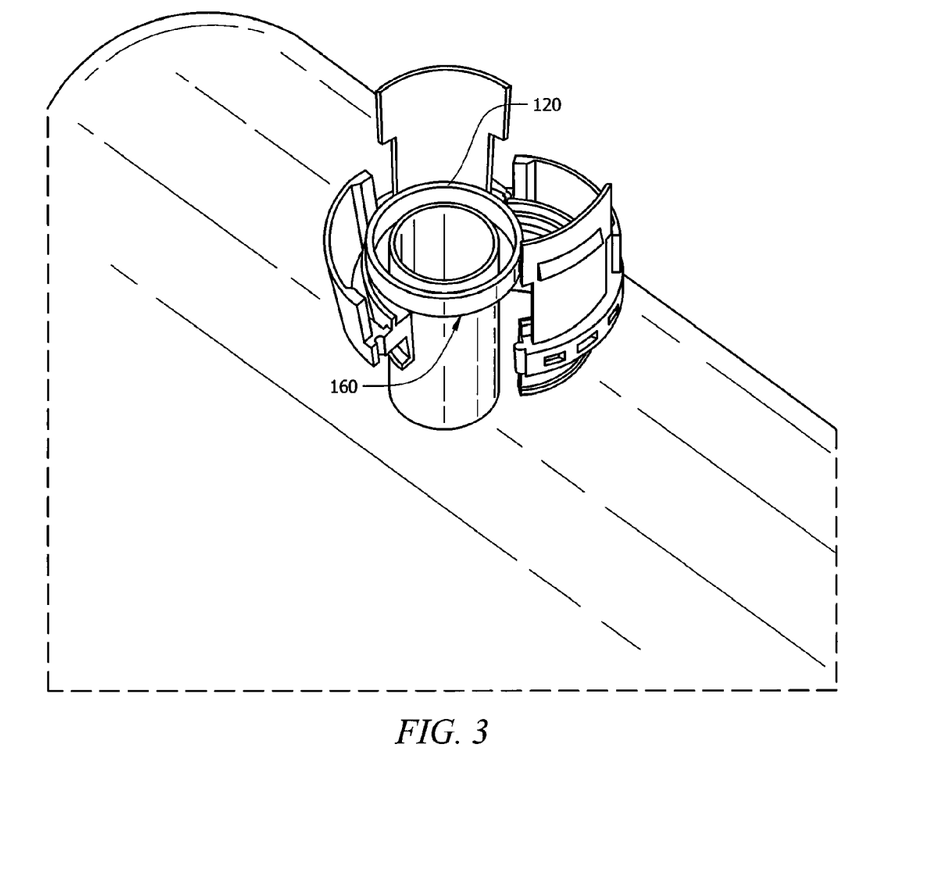
FIG. 3 depicts the end-mounting of the articulated subcomponents.
Figure 4:
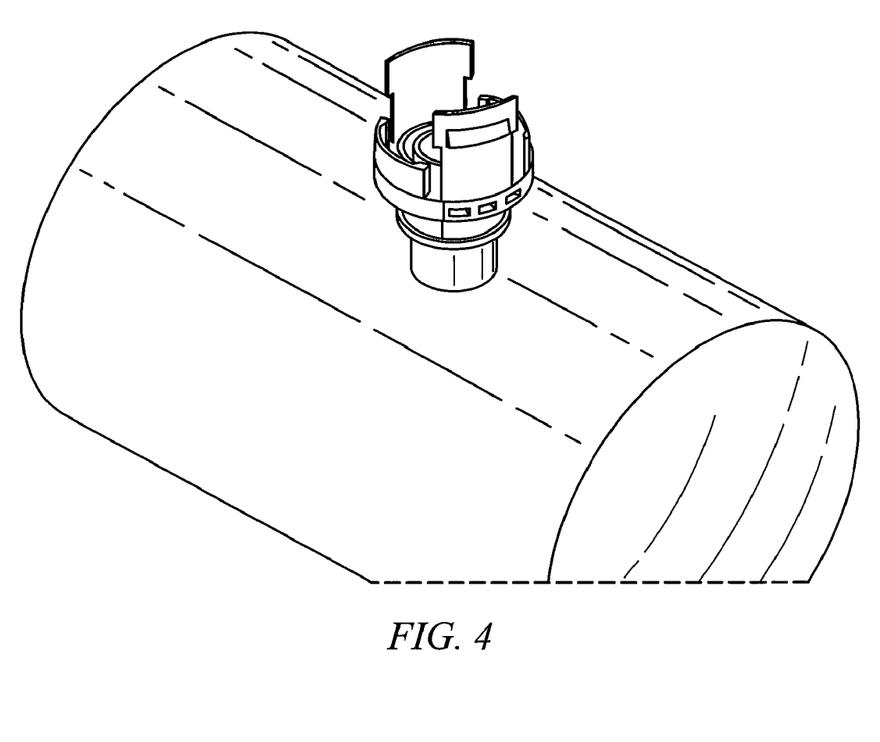
FIG. 4 depicts the end-mounting of the subcomponents which have been closed about the face element.

Each sealing member of the collar component contacts the hose connector stem (stem) over an arc which is, at most, 180 degrees. In one embodiment, the contact with the stem is smooth and continuous over the arc, as illustrated in FIG. 3, however, the contact can be over discrete lengths in such a manner that the sealing elements, when closed about the hose connector stem, each subelement may contact the hose connector stem in a total arc which sums to less than 180 degrees.

It is preferred that both the face element seat and the hose connector contact the face and hose connector elements when the sealing members are in place such that the hose connector and face elements are prevented from lateral motion with respect to the collar component.

In a preferred embodiment, the receiving area is preferably an arc-shaped slot, and lies at a diameter which is outside the outer diameter of the face element seat, measured from the cylindrical axis of the seal.

An effect of the arc-shaped guard wall (250) is to regulate the distance of the mutual approach of the sealing members such that upon formation of the sealing assembly, the pressure on the gasket members is substantially invariant with linear and shear forces acting on the seal members, and thus the gasket does not deform despite stresses which bias the sealing members to move with respect to each other. For example, forces which direct the sealing members toward each other along the cylindrical axis of the seal, or those in the direction of rotation of the seal members in opposite directions about the cylindrical axis of the seal. The guard wall also protects the gasket seal from forces in the plane of, but perpendicular to, the cylindrical axis of the seal.

The receiving area is an arc-shaped slot at a diameter, measured from the cylindrical axis of the seal, which, in a preferred embodiment, is greater than the diameter of the face element seat, in an arc adjacent the arc of pedestal attachment. The receiving area comprises arc-shaped inner and outer walls, with an arc-shaped guard wall with an inner diameter such that the appropriate arc-shaped pedestal/barb ("tang") can pass through upon mating contact. In a preferred embodiment, the guard wall is outside the diameter of the outer wall of the receiving area, with thickened edge portions extending radially inward to the diameter of the outer wall. The thickened edge portions cooperate with the tangs upon mating approach, serving to bend them inward in advance of thrusting through the receiving areas.

Each arc-shaped subcomponent comprises a projecting hinge element (PHE) (270) and a hinge element receptacle (HER) (280). The PHE is separated from a spur (290) by a notch (300). The HER bears a projection on its outermost side. In one embodiment, upon closure of the seal fitting (see FIGS. 2 and 3) about a face component and hose connector, the inner surface of the HER projection overrides the outermost surface of the PHE, such that a "snap-fit" obtains. Thus, opening a seal fitting which is closed about a hose connector/ face element, would require overcoming a snap fitting on one side or the other. Upon full articulation, the HER projection nests into notch (300).

In one embodiment, the inner slope (310) of the hinge element receptacle, while approaching a slope parallel to the inner walls of the face element seat, does not become parallel. As a result its cross section is not an arc of a circle, but instead, it is slightly elongated toward the cylindrical axis, which makes broad articulation easy to achieve without sacrificing smooth continuous articulation. However, it would be expected that such an irregularity would predispose the sub-elements to separate when undergoing the forces involved in completing the sealing assembly. Surprisingly, such dislocations are seldom, if ever observed.

The engagement mechanism of the clamp half that interfaces with the clamp half on the other connector is biased to hold the two clamp quarters together since any force that would tend to separate the clamp pieces (quarters) located on the welded sanitary coupling would work against the curved surface of the engagement tangs; mechanically the concave surface of the engagement tangs will bend easily inward but are very difficult to bend outwards; this feature re-enforces the hoop stress exerted on the clamp pieces when separation force is applied.

Figure 5:
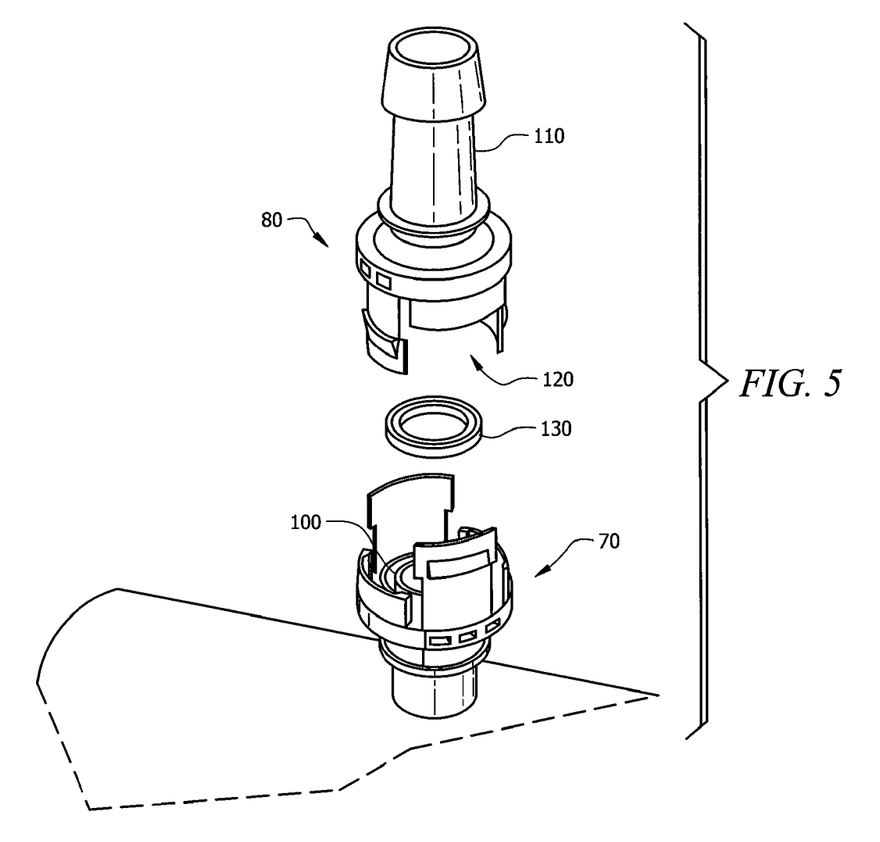
FIG. 5 depicts the axial approach of a complementary one-piece moulded seal fitting, assembled with a face element and hose connector. A gasket element is depicted between the seal fittings
Figure 6:
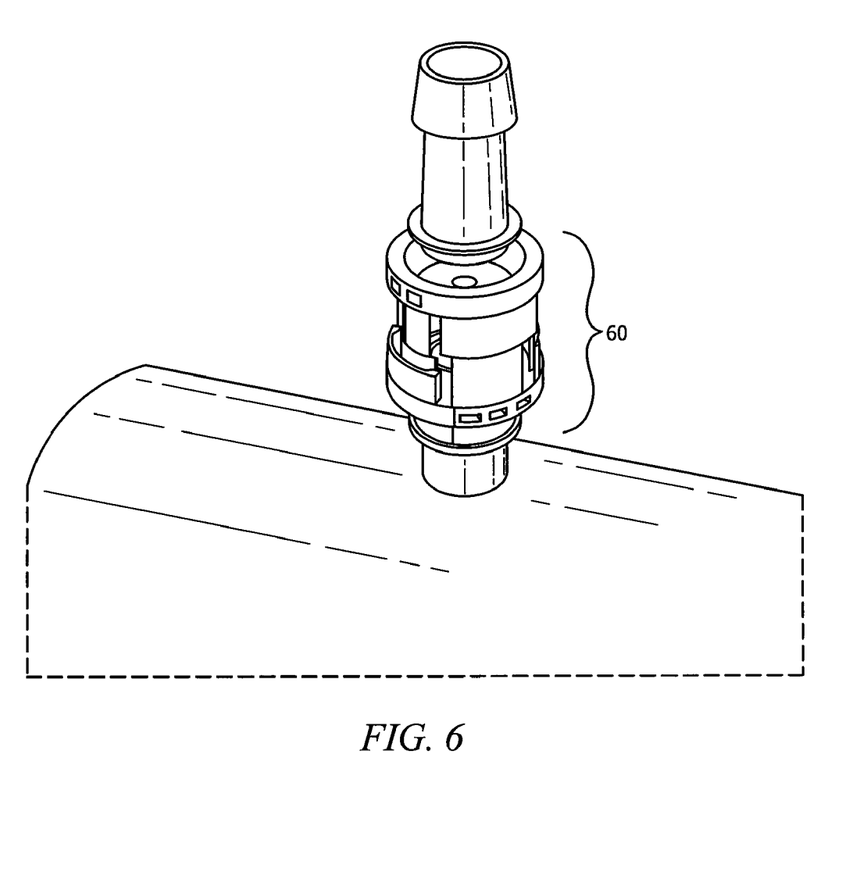
FIG. 6 depicts a completed seal fitting assembly.

Without desiring to be bound by theory, a predictable problem with "front-mounted" designs, particularly those which comprise two substantially identical pieces is that for easily manufactured tang and recess configurations, the forces generated during the formation of the seal tend to disrupt the union of the pieces by moving them with respect to each other upon forcing the composite collar into mating contact with its complementary, seal-completing mate. For example, in the configuration illustrated in FIGS. 5 and 6, upon contacting the collar assembly with a complementary mate, forces are generated due to the elastic nature of the tangs and the unyielding nature of the recesses. Such forces sum to a resultant force which urges one piece out of alignment with the other in a radial direction along the plane of contact shared by the components. With respect to substantially identical subsections which form a collar having the ability to genderlessly mate with which mates with a one-piece genderless seal fitting, this may be true regardless of the number of consecutive tangs and recesses contained in a single collar subsection, but it is particularly true for the situation in which each subsection comprises one recess adjacent to one tang. In addition, a subelement employing a single recess/single tang also experiences a degree of torque about the midarc point in the subelement. This is especially pronounced in early stages of the mating approach, i.e., before the tangs and recesses are fully engaged. An effect of the torque is to pull one terminus away from its complement in the radial direction.

Such forces limit the connection mechanisms which can be employed, particularly in designs wherein the collar subcomponents are substantially identical. Such designs are further constrained in that the connection mechanism must be such that it is of two elements which can be integrated in a mutual fashion, each of which elements to be included at one terminus of each collar sub-element. Furthermore, the integrable elements should remain engaged, regardless of the directions of the forces generated during the action of seal-formation. Moreover, it is preferred that the integrable elements, once engaged, permit the easy articulation of the engaged collar subelements around a stem element. Thus, the engaged integrable elements corresponding to one side of the completed collar element should permit the other termini to separate to such a degree that the appropriate stem element can pass through the separation space. In order to permit articulation, the integrable elements, once engaged, should possess enough hinge functionality such that, while they are easily integrated, the subelements can undergo trouble-free articulation without the integrable members becoming unintegrated. However, the smooth freedom of motion which is desirable generally requires the presence of a cylindrically rounded projection which protrudes from a terminus of each piece. Such a projection is a liability from the standpoint of seal formation in that forces generated during the mating approach, including the radial force mentioned above, as well as the torque tending to separate the collar subelements circumferentially, would be expected to exacerbate the problem of subelements being forced out of position during the mating approach. The rounded projection would be expected to exacerbate the risk of subelement separation: motion in the circumferential direction of one subelement with respect to the other, coupled with the radial displacement force would be expected to cause radial displacement of the subelements. Such radial displacement would not be expected to occur if for example, the projection were rectangular. However, as indicated above, a non-rounded projection would not be able to give a smooth collar-opening functionality.

In some embodiments, the present invention comprises a sealing assembly comprising first and second sealing members, each comprising a face component having an annular groove. At least the first sealing member comprises a hose connector component integral with the face component; and a collar component. The sealing assembly further comprises one or more gasket members partially or fully comprising one or more elastomeric materials and disposed into and fittingly received by the annular groove of said first sealing member. During function, the sealing members are in mutually aligned, pressurized contact mediated by the one or more gasket members. The collar component of the first sealing member comprises two subsections, each subsection contacting the face or hose connector component over an arc of substantially 180 degrees. Each subsection includes a face element seat at a face element seat diameter; a tang comprising an arc-shaped pedestal positioned at a diameter outlying the face element diameter. The pedestal optionally comprises tabs which laterally or circumferentially overhang the pedestal; and a barb positioned on the pedestal. Each subsection further comprises a receiving area at a diameter which is greater than the face element seat diameter. The receiving area is located adjacent the pedestal, and comprises a slot shaped to receive a corresponding pedestal on a mating sealing element. Thus, in the case of an arc-shaped pedestal, the receiving area is preferably an arc-shaped slot. The slot comprises inner and outer walls, and an arc-shaped guard wall, preferably at a diameter outlying the diameter of the outer wall. In one embodiment, the inner and/or outer walls bear projections which function to deform the corresponding tangs of a mating sealing member.

Each subsection also comprises a cylindrically rounded hinge element at one terminus, and a hinge element receptacle at the opposite terminus. The subsections can be interlocked via their respective hinge elements and hinge element receptacles to form the first sealing member, such that the collar component contacts the face and/or hose connector component over a total arc in the range of from about 200 to 360 degrees, and preferably substantially 360 degrees. The second sealing member, which mates with the first, comprises tangs and receiving areas in configurations complimentary to the tangs and receiving areas of the first sealing member such that the sealing assembly can be formed by forcing the tangs on the first through the receiving areas of the second (and the tangs on the second through the receiving areas of the first) such that during the process of forming the sealing assembly, i.e., during axially directed approach of the sealing members, the tangs flex radially upon contacting the tang-deforming projections. The flexion is at least partially relaxed upon further axial motion, mutually immobilizing the sealing members.

It should be noted that the sealing member subsections can continuously contact the hose connector and/or face elements in an arc of substantially 360 degrees, i.e., the termini of the respective subsections meet and substantially form a circle. Included within the ambit of the present invention are sealing assemblies comprising subsections which may have discontinuities such the contact is not commensurate with the entire circumference of the hose and/or face elements. For example, the subelements may contain circumferential gaps, such as those due to design, fabrication constraints, or other necessity, such that the arc of contact is not complete.

Surprisingly, sealing element subelements according to the present inventive design can form sealing elements having the ability to articulate in a continuously hinged manner on two sides without the presence of a permanent hinge. It is thus possible to use only two pieces in the fabrication of the sealing element, and the two pieces can be substantially identical, simplifying manufacturing and purchasing.

In an additional embodiment, the projecting terminus comprises a block extension and the receiving terminus comprises a recess which can receive, preferably fittingly, the projecting terminus. In an embodiment, the projecting terminus is beveled such that upon contact of the termini, the In another embodiment, the attachment is such that the two subcomponents can be separated by opposing linear motions, even upon articulation. In such embodiments, a securing means, such as, for example, a band or clamp may be used to hold the subcomponents together. In one embodiment, the securing means is a band having a thickened end and a tailing end which interacts with the thickened end (410). The thickened end may be a sleeve which accepts the tailing end, which can be advanced through the securing end, in some embodiments, irreversibly. In one embodiment, each sealing subcomponent comprises a port (400) which is capable of seating and immobilizing the securing end upon insertion of the band through the port, tailing end first. In another embodiment, the securing end is a thickened end which tracks the tailing end between the securing end and the port, such that both act to prevent the withdrawal of the tailing end. In such an embodiment, the tailing end is advanced through the port, and is sandwiched between the port and the securing end.

In a preferred embodiment, the port is located next to the hose connector component, and underneath the face seat component (see FIGS. 7, 8 and 9), such that a securing band or clamp, when inserted into the port tail-end first, can be pulled through until the thickened end is caught, with the tail end conveniently routed around the hose connector component, threaded through the port on and routed around the adjacent subcomponent, and threaded back through the port securing the thickened end and pulled taut such that it is secured against the hose connector element.

Figure 7:
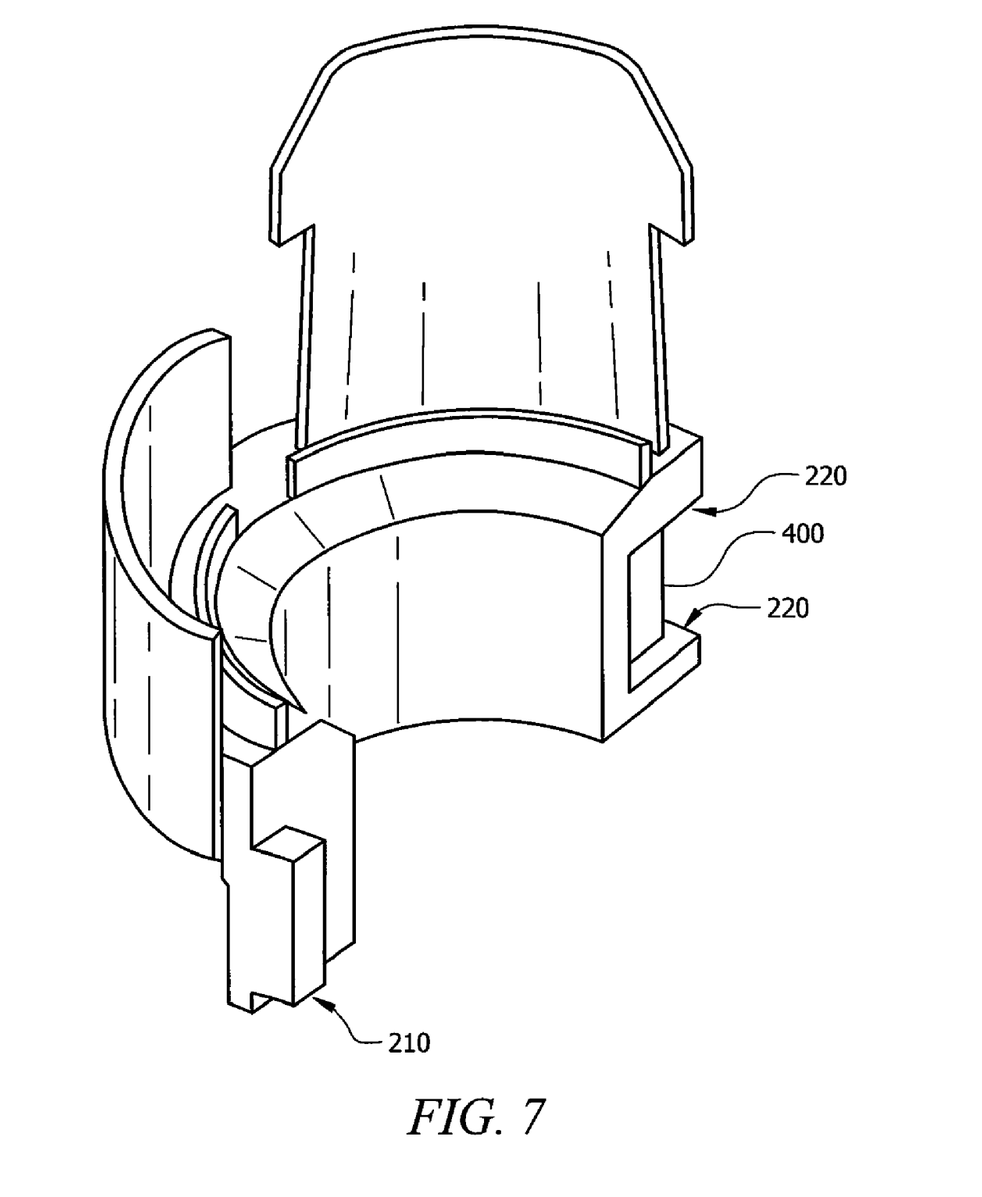
FIG. 7 depicts a seal fitting subcomponent including projection and recess for preventing vertical displacement.

In one embodiment, the ports and the termini can be situated as shown in FIG. 7, with the port located next to the hose connector element, and the terminus outwardly adjacent (i.e., at a greater radius than the port.) As shown in FIG. 7, a port can be integral with the closest terminus. In one embodiment, each subcomponent comprises two ports, one at either end of the subcomponent, with at least one of the ports capable of seating a band. In one embodiment, the subcomponent bears a "seating" port at the terminus which bears a recess. The port at the end bearing a projection may be a seating port, a non-seating port, or merely a slot dimensioned to accommodate the dimensions of a securing band such as is illustrated in FIG. 7.

Figure 2:
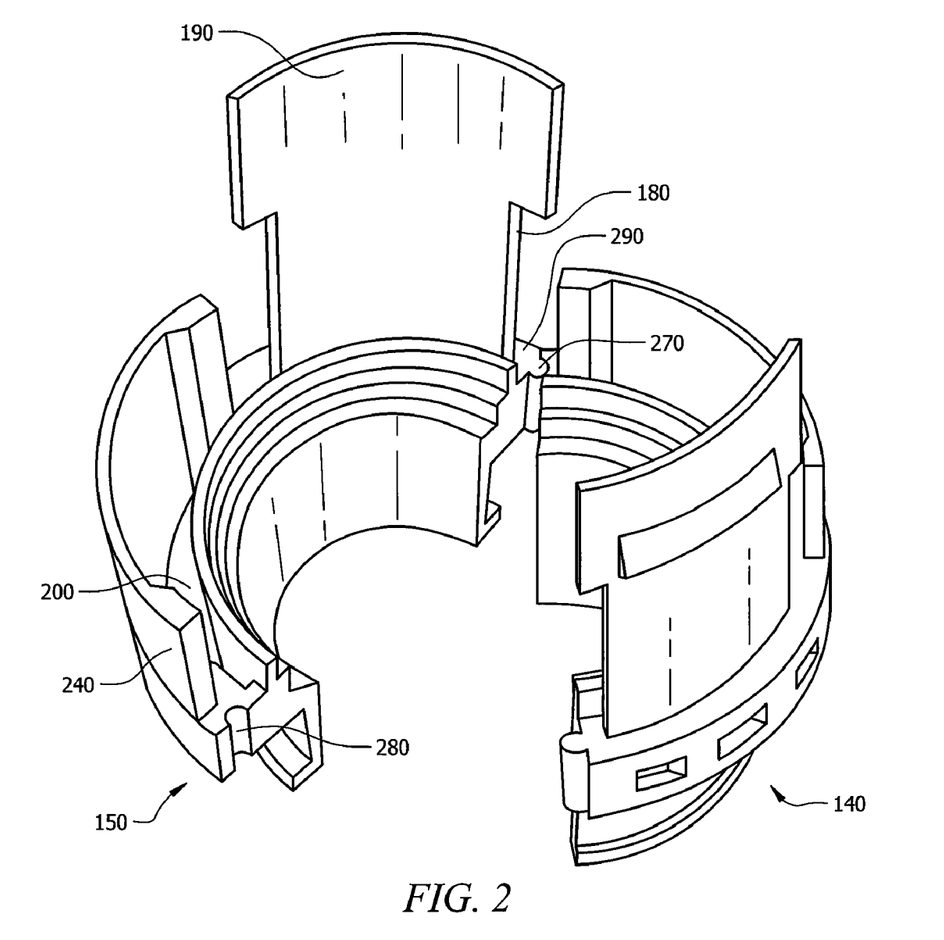
FIG. 2 depicts a seal fitting comprised of two identical seal fitting subcomponents, which are completely articulated.

Please note that "annular groove" as used herein encompasses not only a circumferential slot as illustrated in, for example, FIGS. 2 and 3, but also the situation illustrated in FIG. 7, wherein no inner wall is present. The term "gasket member," as used herein, encompasses not only "O-ring" type elements, such as, for example, elements generally toroidal in shape, and having circular or round cross sections (perpendicular to the plane of the ring, and contained in a plane which contains the vertical axis), but also elements wherein such a cross section is another shape, such as, for example, rectangular.

In yet another embodiment, the recess and projection engage via a dimple or divot on the upper and lower surface of the projection which is complementary to a bump or other shallow, smooth convexity in complementary positions on the recess such that the projection terminus can be pushed into the recess terminus where it catches. In a preferred embodiment, both the upper and lower surfaces of the projection comprise divots or convexities which engage corresponding, complementary structures on the recess such that when the structures are engaged, the divots form the axis of a hinge.

What is claimed is:

1. A sealing assembly comprising:
   first and second sealing members, each comprising:
      a face component comprising an annular groove;
   at least said first sealing member comprising:
      a hose connector component integral with said face component; and
      a collar component;
   one or more gasket members partially or fully comprising one or more elastomeric materials and disposed into and fittingly received by the annular groove of said first sealing member;
   wherein said sealing members are in mutually-aligned pressurized contact mediated by said one or more gasket members; and
   wherein the collar component of said first sealing member comprises two subsections, each subsection contacting said face or hose connector component over an arc of substantially 180 degrees, and comprising:
      i) a face element seat;
      ii) a tang comprising: an arc-shaped pedestal positioned at a diameter outlying the diameter of the face element seat; a barb positioned atop the pedestal and comprising tabs which laterally or circumferentially overhang the pedestal;
      iii) a receiving area outside the face element at a diameter outlying the diameter of the face element seat and adjacent to the pedestal, said receiving area comprising an arc-shaped slot comprising inner and outer walls, an arc-shaped guard wall at a diameter outlying the diameter of the outer wall, tang-deforming projections from a wall selected from a group consisting of the inner walls and the outer walls;
      iv) a projecting hinge element;
      v) a hinge element receptacle;
   wherein said subsections can be interlocked via their respective hinge elements and hinge element receptacles to form the first sealing member, such that the collar component contacts said face and/or hose connector component over substantially 360 degrees;
   and wherein said second sealing member comprises a second tang and a second receiving area, in a configuration complimentary to the tangs and receiving areas of the first sealing member, such that a seal can be formed by forcing the tangs on the first sealing member into the receiving areas of the second such that during axially directed motion, the tangs flex radially upon contacting the projections, at least partially relaxing upon further axial motion, mutually immobilizing said sealing members.

2. A sealing assembly as in claim 1 wherein the tang deforming projections flex the tangs inwardly during seal formation.

3. A sealing assembly as in claim 1 wherein the tang-deforming projections flex the tangs outwardly during seal formation.

4. A sealing assembly as in claim 1 wherein the second sealing member is a one piece connector.

5. A sealing assembly as in claim 1 wherein said second sealing member comprises:
   a hose connector component integral with said face component; and
   a collar component;
   wherein the collar component of said second sealing member comprises two subsections, each subsection contacting said face or hose connector component over an arc of substantially 180 degress, and comprising:
      i) a face element seat;
      ii) a tang comprising: an arc-shaped pedestal positioned at a diameter outlying the diameter of the face element seat; a barb positioned atop the pedestal and comprising tabs which literally or circumferentially overhang the pedestal;
      iii) a receiving area outside the face element at a diameter outlying the diameter of the face element seat and adjacent the pedestal, said receiving area comprising an arc-shaped slot comprising inner and outer walls, an arc-shaped guard wall at a diameter outlying the diameter of the outer wall, tang-deforming projections from a wall selected from a group consisting of the inner walls and the outer walls;
      iv) a projecting hinge element;
      v) a hinge element receptacle;
   wherein said subsections of the second sealing element can be interlocked via their respective hinge elements and hinge element receptacles, such that the collar component of the second sealing element contacts a connector component selected from a group consisting of the face and the hose over substantially 360 degrees; and
   wherein the two subsections of said second sealing member having opposite connectivity handedness with respect to the subsections of the first sealing member.

6. A sealing assembly as in claim 5 wherein the subsections of the second sealing member are identical in shape.

7. A sealing assembly as in claim 5 wherein the subsections of the first sealing member are mirror images to the subsections of the second sealing member.

* * * * *